United States Patent
Tenten

[11] 4,172,263
[45] Oct. 23, 1979

[54] METHODS AND APPARATUS FOR MEASURING SIGNAL-TO-NOISE RATIO

[75] Inventor: Robert C. Tenten, Fanwood, N.J.

[73] Assignee: Home Box Office Inc., New York, N.Y.

[21] Appl. No.: 884,898

[22] Filed: Mar. 9, 1978

[51] Int. Cl.$^2$ .............................................. H04N 7/02
[52] U.S. Cl. ...................................... 358/139; 325/67; 325/363; 328/188
[58] Field of Search ................... 358/139, 10; 325/67, 325/363; 328/188, 187

[56] References Cited

U.S. PATENT DOCUMENTS

| | | | |
|---|---|---|---|
| 3,825,835 | 7/1974 | Hammett | 358/139 |
| 3,995,105 | 11/1976 | Krivosheev | 358/139 |

OTHER PUBLICATIONS

"Optek Type 1010B Video Noise Meter," Jul. 8, 1975.
Weaver, L. E., *Television Video Transmission Measurements*, Luton, England, White Cresent Press, Ltd., 1973, pp. 67–77.

*Primary Examiner*—Howard W. Britton
*Attorney, Agent, or Firm*—Brumbaugh, Graves, Donohue & Raymond

[57] ABSTRACT

Methods and apparatus are disclosed for measuring signal-to-noise ratio in video waveforms based on a novel application of the tangential noise measurement principle. A calibrated video staircase test waveform is generated at the transmit end which permits a direct noise reading in dB at the measurement location by use only of a general purpose oscilloscope and associated band limiting and weighting filters. The measurement is fast, straightforward and objective in nature.

24 Claims, 13 Drawing Figures

METHODS AND APPARATUS FOR MEASURING SIGNAL-TO-NOISE RATIO

BACKGROUND OF THE INVENTION

1. Field of the Invention

The present invention relates in general to the measurement of signal-to-noise ratios and in particular to an improved and simplified technique for measuring random noise levels in video waveforms.

2. The Prior Art

Various techniques exist for making video signal-to-noise measurements. Generally these techniques fall into one of two broad categories: one, measurement by video noise meter and, two, estimation of noise strength based on visual observation of the noise waveform on a waveform monitor. Although techniques of the first type have been perfected which afford objective noise measurements of good accuracy, e.g., on the order of ±1 dB, such techniques require specialized test devices that are often unavailable under operational conditions at measurement locations. The specialized video noise meters required by these techniques are also comparatively costly, which detracts from their suitability for many applications.

Existing visual observation techniques, while in some instances avoiding the need for special test equipment, are of uncertain accuracy owing to their dependency on the skill and subjective judgment of the observer. One method of this type involves the estimation of the quasi peak-to-peak noise voltage. In practice, it has been found that although a particular individual might consistently obtain results within ±1 dB using the quasi peak-to-peak method, errors in the signal-to-noise ratios obtained by a number of observers can in some conditions be quite large. For example, tests reported in the literature of a number of skilled engineers who were allowed to set their own viewing conditions for the quasi peak-to-peak technique have shown a range of variation in the signal-to-noise ratio measurements among the engineers of about 5 to 6 dB.

Improvements over the basic quasi peak-to-peak method may be obtained by the use of a storage oscilloscope under standardized conditions. This technique has the advantage of greatly reducing the effect of the observer's judgment in the accuracy of the reading, but has the correlative disadvantage of requiring a costly, and frequently unavailable, storage oscilloscope.

Another known direct observation method is the tangential noise measurement technique. This measurement is made by displacing the random noise waveform vertically, by the addition of a square wave of variable and known amplitude, to produce two bands of noise separated by a clear, dark interval. The amplitude of the square wave is then progressively reduced until an area of uniform brightness is obtained in the center of the display. The amplitude of the square wave for this critical condition is a measure of the r.m.s. noise voltage, which is directly related to the signal-to-noise ratio. Tests of this technique, as practiced in the prior art, have shown improved accuracy relative to the quasi peak-to-peak technique, with variations in results among a number of observers being on the order of 1.5 dB. The method, however, still involves a subjective judgment of noise trace thickness on the part of the observer, and it therefore may be expected that the signal-to-noise ratio readings produced by certain individuals will differ appreciably from the most probable values.

SUMMARY OF THE INVENTION

It is therefore an object of the present invention to provide a video signal-to-noise measurement technique which is at once both objective in nature and capable of being practiced without specialized test equipment at the measurement location.

It is a further object of the invention to provide signal-to-noise measurement methods and apparatus based on the tangential noise measurement principle which substantially eliminate the subjective element inherent in the prior practice of that principle.

Still another object of the invention is to provide a signal-to-noise measurement technique which enables consistently accurate results to be obtained with the use at the measurement location of only a general purpose oscilloscope and associated band pass and weighting filters.

A further object of the invention is to provide a novel waveform generator for generating various video staircase test waveforms useful in measuring signal-to-noise levels in video signal transmission paths in accordance with the invention.

The foregoing and other objects of the invention are attained by the provision of methods, and apparatus for practicing such methods, for measuring signal-to-noise ratios over a video signal transmission path in which a calibrated full field video staircase test waveform is generated at the transmit end, transmitted over the transmission path, and displayed on a waveform monitor at the receiving end. The voltage spacing between the steps of the staircase test waveform is changed at intervals across the full video field, with each of the voltage spacings corresponding to a particular signal-to-noise ratio in accordance with the principle of tangential noise measurement. The staircase steps appear on the waveform monitor display as vertically spaced-apart horizontal lines, and the spacing between vertically adjacent ones of such lines correspond to the signal-to-noise ratios of the test waveform. The signal-to-noise ratio of the transmission path may be read directly from the waveform monitor display as that lowest ratio value provided in the test waveform for which the corresponding horizontal lines of the monitor display are filled in with noise to substantially uniform brightness.

In accordance with the invention, no calibration or special equipment is required at the receiving end. The waveform monitor may simply be a general purpose oscilloscope. If desired, band limiting and weighting filters may also be provided at the receiving end to yield a frequency-selective and/or weighted noise measurement.

In a preferred embodiment, the voltage spacing between the steps of the staircase test waveform is progressively increased across the video field, e.g., in amounts which correspond to increments of 1 dB in the signal-to-noise level, so as to provide horizontal lines on the waveform monitor whose spacings correspond to a progression of signal-to-noise values, e.g., at 1 dB increments. This permits noise measurements over a range of signal-to-noise ratios, e.g., a 10 dB or a 20 dB range, by use of a single test waveform and a single monitor display. It also allows the operator readily to determine the signal-to-noise ratio of the received signal by scanning the horizontal lines of the display in progression until the last lines to be filled in to substantially uniform brightness is reached. Suitably the staircase test waveform includes a number of steps, e.g., five, at each voltage spacing so as to generate on the monitor display a set of vertically-spaced horizontal lines of like number, e.g., five, of equal vertical spacing.

According to a further feature of the invention, the waveform monitor preferably includes a horizontal sweep vernier control, and the vernier control is adjusted such that each set of horizontal lines occupies one horizontal division of the monitor screen. Each horizontal division thus represents a particular signal-to-noise ratio, which further facilitates reading the noise level from the test waveform display.

The intervals at which the voltage spacing between the steps of the staircase test waveform is changed may correspond to a predetermined number of horizontal scan lines, e.g., every 25 lines for a total of ten different signal-to-noise values over a full 256 line video field, or to the occurrence of timed intervals within each horizontal line signal. The latter permits a greater range of signal-to-noise ratios to be measured on a single display. Where the voltage spacing is changed at intervals of scan lines, the spacing for each line within each interval may be held constant or it may be varied at intervals within the line.

As a further feature of the invention, a novel waveform generator useful in generating calibrated staircase test waveforms in accordance with the invention includes a clock, a circuit responsive to the clock pulses for generating a horizontal line signal, including a blanking signal and a sync pulse, at a predetermined rate, a circuit responsive to the clock pulses and to the absence of the blanking signal for generating a staircase signal during the active part of each horizontal line, the staircase signal having a predetermined number of steps whose spacing or spacings represent particular signal-to-noise ratios according to the tangential noise measurement principle, and a combining circuit for combining the horizontal line signals and the corresponding staircase signals to produce the composite staircase test waveform. In a preferred embodiment, the circuit for generating the staircase signal comprises an addressable memory in which are stored voltage data corresponding to the voltage levels of the staircase signal, a counter responsive to the clock pulses during the active part of each horizontal line for addressing the memory locations for the line in question, and a digital-to-analog converter for generating the analog staircase voltage signal in response to the voltage data.

BRIEF DESCRIPTION OF THE DRAWINGS

For a more complete understanding of the invention, reference may be made to the following description of exemplary embodiments thereof, taken in conjunction with the figures of the accompanying drawings, in which.

DETAILED DESCRIPTION OF EXEMPLARY EMBODIMENTS

The present invention embodies a novel application of the principle of tangential noise measurement. The essential concepts of that principle are outlined above. A more detailed explanation may be found at pages 74 and 75 of Television Video Transmission Measurements, L. E. Weaver, White Cresent Press Ltd., Luton, England, Second Reprint, Feb. 1973, which explanation is incorporated herein by reference.

Figure 1:
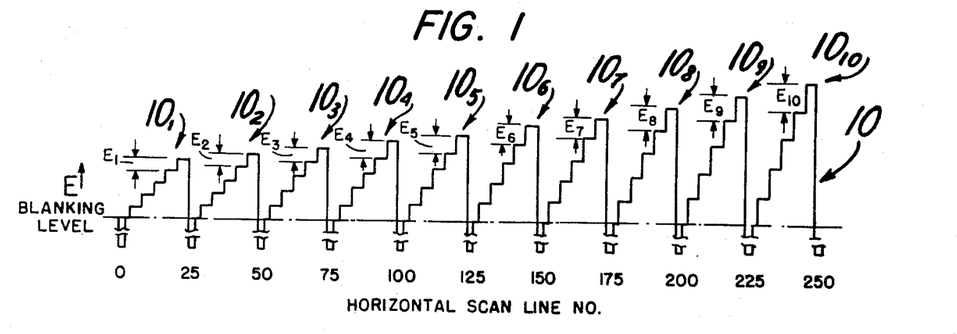
FIG. 1 is a graphical representation illustrating one form of video staircase test waveform useful in accordance with the invention.
Figure 2:
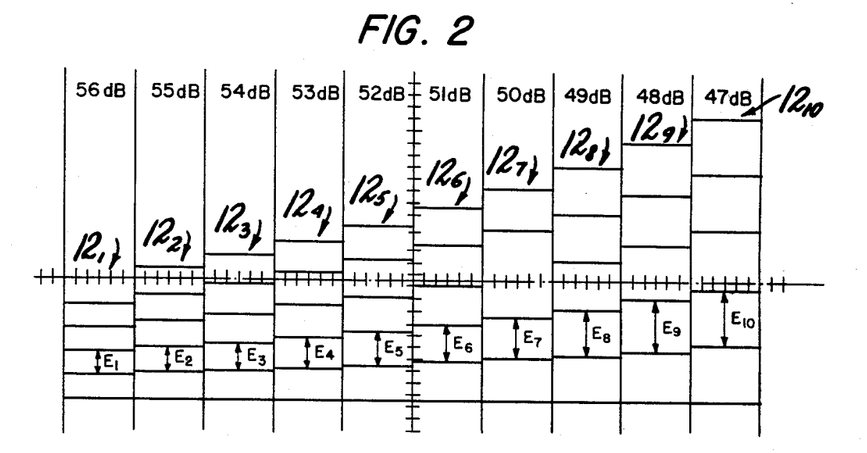
FIG. 2 illustrates a full field display produced on a oscilloscope by application thereto of a noise-free test waveform of the type shown in FIG. 1.
Figure 3:
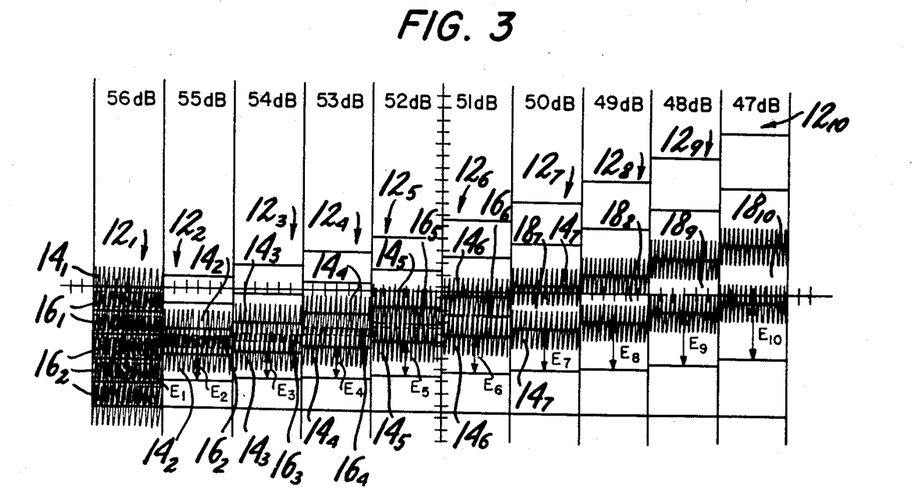
FIG. 3 illustrates a full field oscilloscope display of a noise-bearing test waveform of the type shown in FIG. 1, with the noise being omitted from some of the test waveform lines for clarity of illustration.

In the embodiment of the invention illustrated in FIGS. 1 to 3, a full field video staircase test signal is generated in which the voltage level or spacing (E) between the steps of the staircase is changed at intervals across the video field to provide in effect a series of staircase signals, each having a different riser voltage $E_1$, $E_2$, $E_3$, etc. In the particular waveform 10 shown in FIG. 1, the voltage spacing is progressively increased every 1.4 msec., i.e., every 25 horizontal scan lines, so as to provide a composite staircase waveform having ten segments $10_1$ to $10_{10}$ of ten progressively larger voltage spacings $E_1$ to $E_{10}$, respectively. For each horizontal line within the same interval or segment $10_1$, $10_2$, etc., the waveform has a predetermined number of steps of constant magnitude $E_1$, $E_2$, etc., five being shown in FIG. 1. When displayed on an oscilloscope with the horizontal sweep set to display one field of the waveform, as depicted in FIG. 2, the composite waveform of FIG. 1 appears as ten sets or groups $12_1$ to $12_{10}$ of horizontal lines whose number correspond to the number of voltage levels or steps per horizontal line and whose vertical spacings correspond to the voltage levels $E_1$ to $E_{10}$ of the test waveform.

As is described more fully hereinafter, the staircase test waveform is calibrated at the transmit end such that each voltage spacing $E_1$ to $E_{10}$ in FIG. 2 corresponds to a specific signal-to-noise ratio. That is to say, each voltage spacing $E_1$ to $E_{10}$ corresponds to the amplitude of the square wave which, with random noise present on the test waveform of FIG. 1, would result in the dark intervals between the associated set of lines $12_1$ to $12_{10}$ of FIG. 2 just disappearing when noise is present in an amount corresponding to the signal-to-noise ratio of that set of lines. If, as shown in FIG. 2, the vernier control of the scope sweep is then adjusted so that each set of lines fills one horizontal division of the screen, each horizontal scope division will correspond to a specific signal-to-noise ratio. The number and range of signal-to-noise ratios which may be measured in this manner is determined by the frequency of change in the riser voltage (E) of the staircase waveform and by the magnitude of such change. In the waveform of FIG. 1, for example, the voltage E is progressively increased between steps $10_1$, $10_2$, $10_3$, etc., so as to provide a 1 dB increment in the signal-to-noise ratio between the sets of lines $12_1$, $12_2$, $12_3$, etc., in FIG. 2, thereby covering a range of 10 dB over the ten sets $12_1$ to $12_{10}$, such as, for example, from 56 dB to 47 dB.

The staircase test waveform is calibrated by selecting the smallest voltage spacing $E_1$ to correspond to the highest signal-to-noise ratio for which a measurement is desired. In FIG. 2, for example, this has been selected as 56 dB. In accordance with the tangential noise measurement principle, $E_1$ would thus be the displacement voltage at which the dark intervals between the horizontal lines of set $12_1$ in FIG. 2 would just disappear when noise is present on the waveform in an amount corresponding to a 56 dB signal-to-noise ratio. Using a test waveform having a known signal-to-noise ratio of 56 dB, as determined by measurement with a suitable noise power meter for instance, the magnitude of $E_1$ in the staircase waveform would be gradually reduced until the dark bands just disappeared between the horizontal lines in the first set of lines $12_1$ in FIG. 2. The value of $E_1$ thus determined would correspond to a signal-to-noise ratio of 56 dB, as would the first set of lines $10_1$ in FIG. 2. Thereafter, the voltage spacings $E_2$, $E_3$, $E_4$, etc., between succeeding steps in the staircase signal would be successively adjusted in a like manner to provide successively lower signal-to-noise readings at the desired increment or increments, e.g., 1 dB. Hence, succeeding sets of lines in FIG. 2 would represent successively lower signal-to-noise ratios. It may be seen, therefore, that with the calibrated test signal of the present invention, an operator can make a signal-to-noise measurement simply by observing a full field view of the test waveform on an oscilloscope and counting the number of sets of lines $12_1$, $12_2$, $12_3$, etc., or the number of horizontal divisions on the scope face where the scope sweep is adjusted as aforementioned, until he reaches the set where dark banding just disappears between the sets of horizontal lines. This will be more apparent from consideration of FIG. 3.

FIG. 3 depicts how a full field view of the staircase waveform of FIG. 1 might look when random noise is present on the waveform. Referring first to the first set of lines $12_1$, which in the embodiment shown corresponds to a signal-to-noise ratio of 56 dB, it will be seen that a random noise band $14_1$ is superimposed on each horizontal line and that the noise bands on adjacent lines overlap in regions $16_1$. On an oscilloscope, the first set of lines would appear as fully filled in. It would therefore be understood that the signal-to-noise ratio is worse than 56 dB, and the operator would move to the second set of lines $12_2$. For clarity, noise bands $14_2$, etc., are shown on only two of the horizontal lines of set $12_2$ and succeeding sets $12_3$, $12_4$, etc., although it will be understood that noise would be present in equal amounts on all of the lines of all of the sets.

In set $12_2$, overlapping of the noise bands $14_2$ again occurs, in region $16_2$, and the lines of set $12_2$ would thus also appear filled in, indicating that the noise level is worse than 55 dB. Considering then in turn sets $12_3$, $12_4$ and $12_5$, it may be seen that the noise bands $14_3$, $14_4$ and $14_5$ overlap respectively at regions $16_3$, $16_4$ and $16_5$, thereby completely filling in sets $12_3$, $12_4$, $12_5$ to substantially uniform brightness and indicating that the signal-to-noise ratio is at least as low as 52 dB.

Skipping over set $12_6$ for the moment, and looking at set $12_7$, it may be seen that a clear interval or band $18_7$ (which will appear as a dark interval on an oscilloscope) exists between the noise bands $14_7$ on adjacent horizontal lines of the set. These intervals become even larger in the later sets $12_8$, $12_9$ and $12_{10}$, as indicated at $18_8$, $18_9$ and $18_{10}$, respectively. The presence of such clear, dark bands between the spaced noise bands indicates that the signal-to-noise level of the incoming composite signal is better than those corresponding to any of the sets $12_7$ to $12_{10}$.

Returning now to set $12_6$, it may be seen that the noise bands $14_6$ just barely touch at region $16_6$. This condition results in a faint dark line between the adjacent noise bands, which is discernible to the operator as a lessening in the brightness of the noise bands on the scope display. In accordance with the principle of tangential noise measurement, then, the signal-to-noise ratio of the incoming signal is the ratio for set $12_5$, since it is the last set which is filled with noise of substantially uniform brightness. Hence in the illustration of FIG. 3, the signal-to-noise ratio of the composite signal is 52 dB.

Figure 4A:
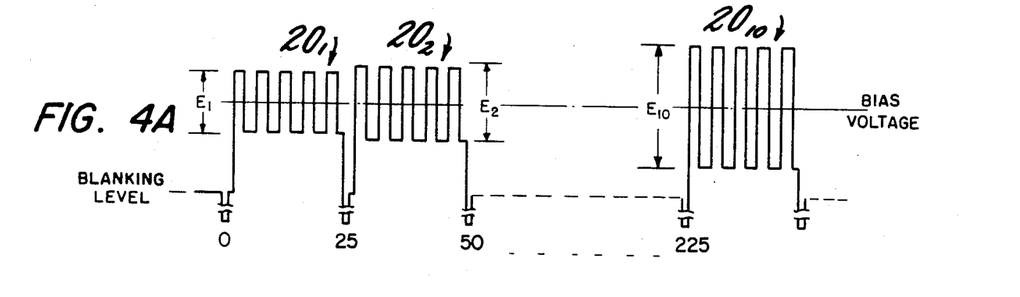
FIGS. 4A–4D depict other forms of video staircase test signals useful in accordance with the invention.
Figure 5A:
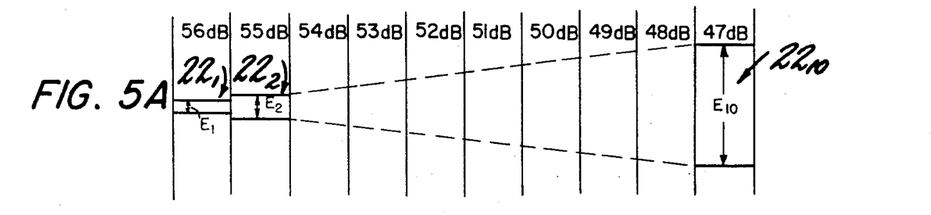
FIGS. 5A–5D illustrate full field oscilloscope displays produced by noise-free video waveforms of the types shown in FIGS. 4A–4D, respectively.

FIG. 1 shows a composite staircase test waveform with five steps or voltage levels within each segment $10_1$ to $10_{10}$. Although plural steps at each E value are advantageous, if desired only a single step at each E value may be used in accordance with the invention. Thus, in the video test waveform of FIG. 4A, the voltage $E_1$ is held constant over the segment $20_1$, the voltage $E_2$ is held constant over the segment $20_2$, and so on through segment $20_{10}$. Also, the lower level of $E_1$ is raised above both the blanking level and the black level (not shown) so as to permit adjustment of the voltages $E_1$ through $E_{10}$ upwards and downwards from a reference or bias level. This waveform results in the diverging full field scope display portrayed in FIG. 5A. As the test waveform of FIG. 4A includes ten segments $20_1$ to $20_{10}$ of different riser voltages $E_1$ to $E_{10}$, respectively, the scope display likewise includes ten sets of lines $22_1$ to $22_{10}$, each set including two spaced lines corresponding to the upper and lower levels of the voltages $E_1$ to $E_{10}$. Like the waveform of FIG. 1, each voltage $E_1$ to $E_{10}$ is calibrated to correspond to a particular signal-to-noise ratio at intervals of 1 dB, and the display of FIG. 5A thus permits noise measurement over a 10 dB range. The signal-to-noise ratio of the incoming signal is the ratio which corresponds to the particular set of lines $22_1$ to $22_{10}$ which is the last to be filled with noise to substantially uniform brightness.

Figure 4B:
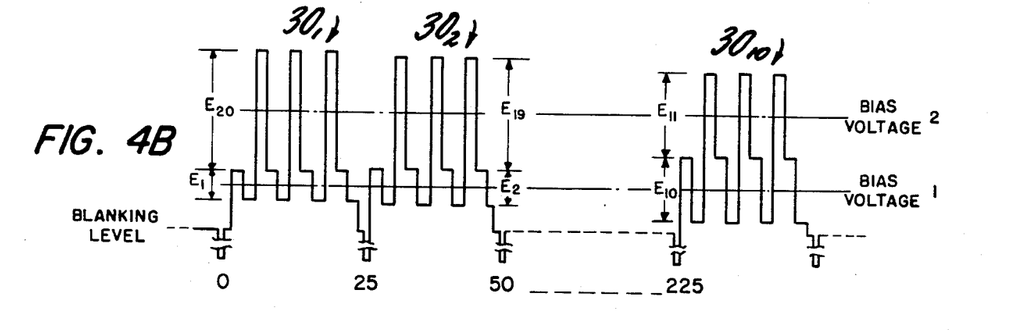
Figure 5B:
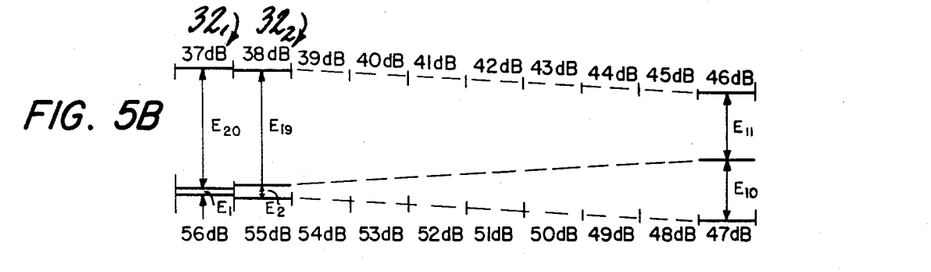

FIG. 4B illustrates a staircase test waveform which is useful, in accordance with the invention, to make noise measurements over an even greater range, e.g., 20 dB. FIG. 5B depicts the corresponding full field scope display. In the waveform of FIG. 4B, two voltage values E are provided within each segment $30_1$ to $30_{10}$ of horizontal scan lines, e.g., every 25 lines, thereby producing in the corresponding groups or sets $32_1$ to $32_{10}$ of FIG. 5B two different vertical line spacings, one corresponding to the lower E values, i.e., $E_1$ to $E_{10}$, and the other corresponding to the higher E values, i.e., $E_{11}$ to $E_{20}$. The voltage values progressively increase from left to right from $E_1$ to $E_{10}$ and from right to left from $E_{11}$ to $E_{20}$. The display of FIG. 5B therefore may be conveniently read by scanning it from left to right and then right to left until the last uniform-intensity line set is found. By this construction of the staircase waveform, a 20 dB range of signal-to-noise values may be measured, as, for instance, from 56 dB to 37 dB.

Figure 4C:
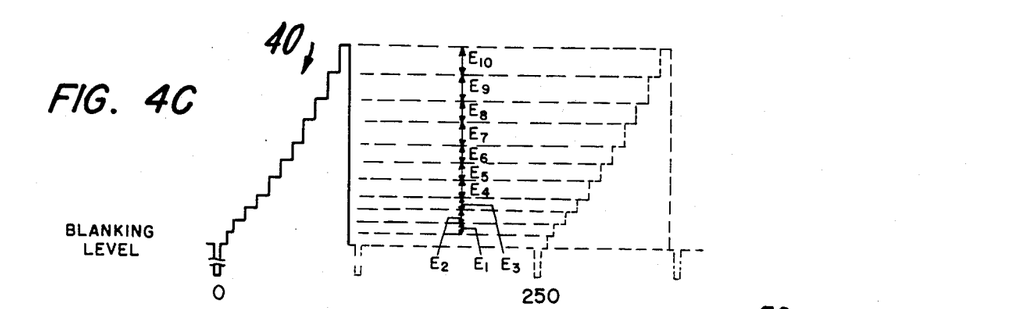
Figure 5C:
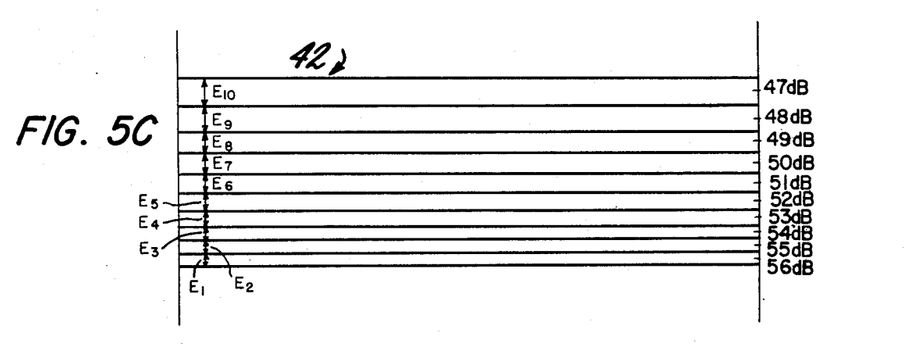

FIGS. 4C and 5C depict still another form of staircase test signal and its associated full field display. In the waveform 40 of FIG. 4C, there are ten distinct steps $E_1$ to $E_{10}$ of progressively increasing magnitude, and each of these steps or voltages is held contant across the entire 262.5 line field. Accordingly, the full field oscilloscope display of FIG. 5C constitutes a single set 42 of horizontal lines which extend across the full width of the scope face and which are spaced apart by progressively greater distances in accordance with the progressively increasing values of $E_1$ to $E_{10}$. This display provides a 10 dB range of signal-to-noise level measurements, e.g., from 56 dB to 47 dB.

Figure 4D:
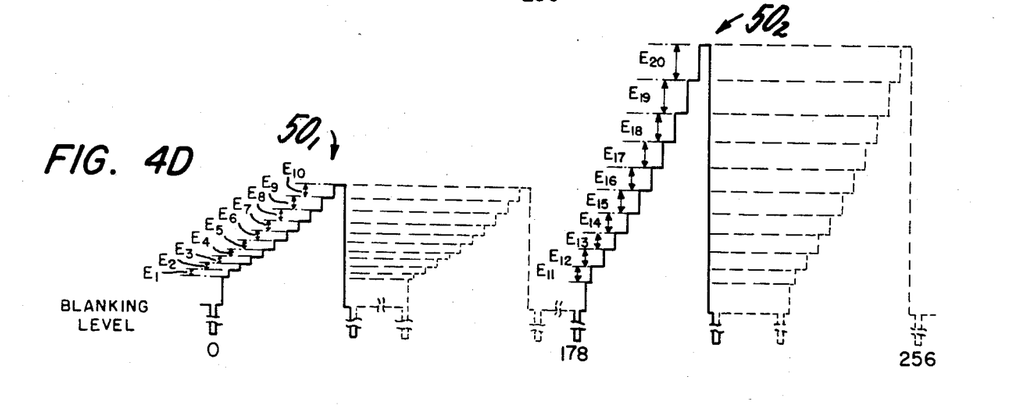
Figure 5D:
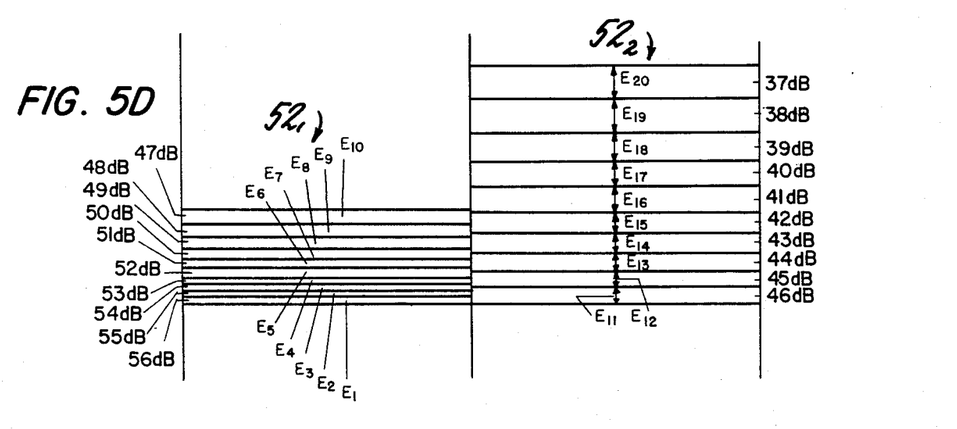

FIGS. 4D and 5D depict a staircase waveform and full field display similar to those of FIGS. 4C and 5C, but affording twice the noise measurement scale. To that end, the test waveform in FIG. 4D comprises a two-segment staircase signal, with the respective segments $50_1$ and $50_2$ each occupying approximately half the field. As illustrated, segment $50_1$ defines ten increasing voltages $E_1$ to $E_{10}$ and segment $50_2$ defines an additional ten voltages $E_{11}$ to $E_{20}$ which progressively increase beyond the magnitude of $E_{10}$. The full field view of FIG. 5D takes the form of a two-line set display, including in the first set $52_1$ thereof ten horizontal lines having vertical spacings determined by the voltages $E_1$ to $E_{10}$, and which correspond to ten signal-to-noise ratios as indicated, and in the second set $52_2$ thereof ten additional horizontal lines of still greater vertical spacings determined by the voltages $E_{11}$ to $E_{20}$, and which correspond to ten progressively lower signal-to-noise ratios.

It will be understood that the staircase test waveforms shown in FIGS. 1 and 4A–4D are illustrative only and that still other waveforms may be used in accordance with the invention, and also that the range of signal-to-noise ratio measurements which the test signal affords may be varied from the 10 dB or 20 dB range shown as may be required for a particular application.

Figure 6:
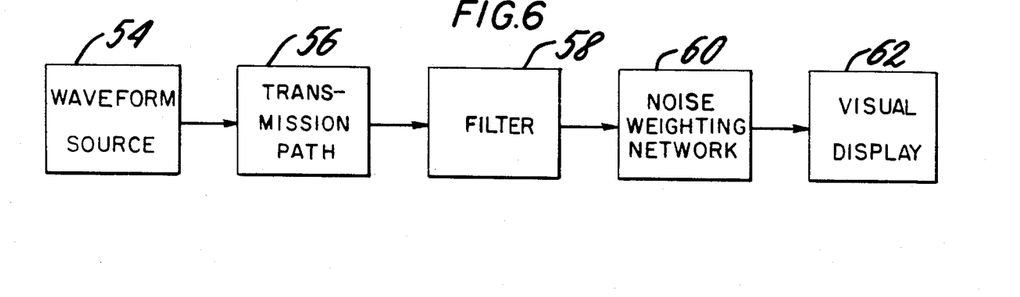
FIG. 6 is a block diagram of a system for implementing the video signal-to-noise ratio measurement technique of the invention.

FIG. 6 depicts a generalized system for implementing the measurement technique of the invention. The technique has application to a wide variety of transmission systems and devices, including, for example, transmissions between satellites and earth stations, microwave transmission systems, cable television systems, storage devices such as video playback cassettes, TV cameras, and the like. Such systems and devices are herein collectively referred to as the transmission path, as shown at 56 in FIG. 6. At the transmit end, the system in its simplest form need include only a test waveform source 54. This may comprise a staircase waveform generator, a preferred embodiment of which is described hereinafter, or, alternatively, a recorded test signal, such as might be made at the beginning of a video tape to enable monitoring of the overall record-playback signal-to-noise ratio. At the measurement location, or receiving end, the system includes a band limiting filter 58, such as a low pass or a band pass filter, to remove noise outside of the desired video bandwidth, and in addition preferably includes a CCIR weighting filter 60 to "shape" the noise over the frequency band to correspond to the response of the human eye, thereby yielding a weighted signal-to-noise ratio measurement. Where a weighted noise measurement is not desired, the noise weighting filter 60 may be omitted. Beyond the filters 58 and 60 all that is required at the measurement location is a video display device 62, such as general purpose oscilloscope. Suitably, the oscilloscope 62 should have a bandwidth which is flat over the frequencies of interest, i.e., for standard video signals from about 5 MHZ to 10 MHZ, and should have a minimum sensitivity of about 20 mv/division. DC coupling is desirable but not necessary. As indicated above, a scope vernier control would be useful for adjusting the display so that each set of horizontal lines fills one horizontal division of the scope, but again this is not essential.

Figure 7:
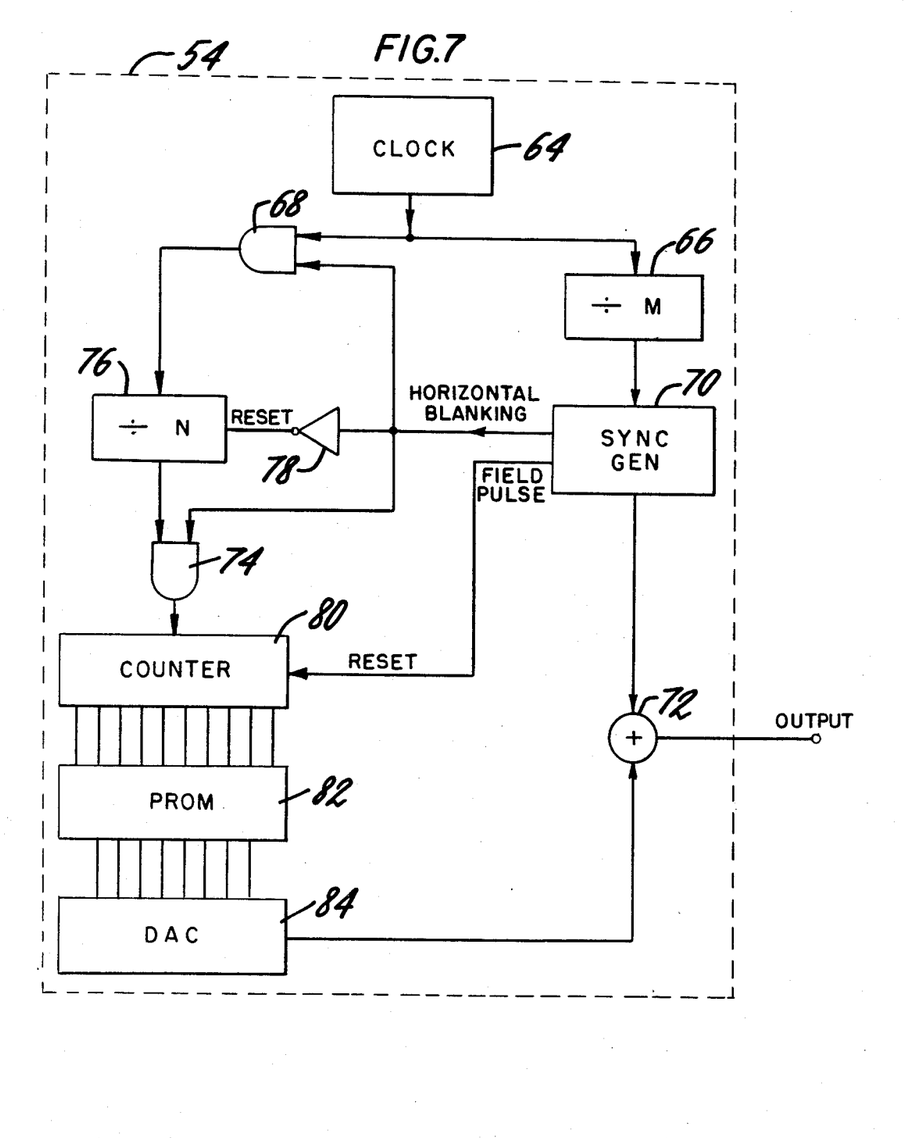
FIG. 7 is a schematic diagram of a waveform generator for generating video staircase test waveforms in accordance with the invention.

FIG. 7 schematically illustrates a preferred form of staircase waveform generator for use as the waveform source 54 in the system of FIG. 6. The generator is programmable so as to be capable of generating all of the test waveforms of FIGS. 1 and 4A–4D as well as other specific staircase waveforms. It includes a master clock 64 which applies output pulses at a desired rate to a divide circuit 66 and to a normally open gate 68. The divide circuit 66 divides the clock pulses by a predetermined factor M, and upon every Mth clock pulse transmits a signal to a conventional video sync generator 70. As will be understood, the sync generator 70 includes a blanking amplifier and horizontal synchronization-impulse generator which, in response to receipt of an output pulse from the divide circuit 66, generate the standard video blanking signal and horizontal sync pulse. Conveniently, the divisor M is selected such that the divide circuit 66, and thus the sync generator 70, will generate a horizontal line signal at the same rate as the standard television horizontal scan rate, i.e., every 63.49 $\mu$sec. The output signals from the sync generator 70 are applied as one input to an add circuit 72. The blanking signal associated with each horizontal scan line is applied to the gate 68 and also to a second gate 74, for the purpose of disabling the gates during the blanking interval. This assures that the clock pulses will be passed by the gates only during the active part of the horizontal line.

The clock pulses transmitted by gate 68 are applied to a divide-by-N circuit 76. As will become apparent, the value of N is selected relative to that of M to provide the desired number of voltage level changes or steps per horizontal line. In the waveform of FIG. 1, for example, N has been selected to produce five steps per line. The blanking signal is also applied to an inverting amplifier 78 for the purpose of resetting the divide circuit 76 at the beginning of each horizontal line. This is done to avoid carryover to the next line of spurious clock pulses.

The output pulses from the divide-by-N circuit 76 increment a digital counter 80 which is coupled by an address bus to a programmable read-only memory 82, itself coupled by a data bus to a digital-to-analog converter 84. The counter 80, PROM 82, and DAC 84 are conventional. The PROM 82 contains a storage location for each different voltage level or step to be included in the staircase waveform. In the case of FIG. 1, therefore, where there are five steps per line, twenty-five lines per segment, and ten different segments $10_1$–$10_{10}$, the PROM 82 would include at least 1250 storage locations, each corresponding to a particular address input from the counter 80. A specific voltage $E_1$, $E_2$, $E_3$, etc., or a multiple thereof, is stored (in digital form) at each such storage location. Upon receipt from the counter 80 of a specific address, the PROM 82 transmits a voltage data output to the DAC 84 which corresponds to the specific voltage stored at that address. The DAC 84 then converts the voltage data to an analog voltage of the appropriate magnitude.

Thus for a single horizontal line in the waveform of FIG. 1, the counter 80 would be incremented five times by the divide circuit 76, resulting in five address inputs to the PROM 82 calling for five voltage increases of constant magnitude $E_1$, $E_2$, $E_3$, etc., depending on which horizontal line in the field is being scanned. For example, for the first horizontal line in the FIG. 1 waveform, the counter 80 would produce five addresses, say 1, 2, 3, 4, 5, at which would be stored the voltages $E_1$, $2E_1$, $3E_1$, $4E_1$, $5E_1$, respectively. Upon read out and conversion by the DAC 84 to an analog signal, these voltages would result in the five-step staircase waveform shown in segment $10_1$ of FIG. 1. This process would be repeated for each succeeding horizontal line, with the counter 80 being incremented from address to address by the pulses from the divide circuit 76. Since the same voltage rise $E_1$ is used for the first twenty-five lines in FIG. 1, all of the storage locations in the PROM 82 which correspond to the addresses for the steps of the first twenty-five lines, i.e., the first 125 locations, would have the voltages $E_1$, $2E_1$, $3E_1$, $4E_1$ and $5E_1$, as the case may be, stored therein. However, upon initiation of the twenty-sixth line, i.e., upon transmission to the counter 80 of the 126th pulse from divide circuit 76, the PROM 82 would be instructed to read out the voltage data for the first step of staircase segment $10_2$, this being the voltage $E_2$, and thereafter, upon receipt of the remaining four pulses from the twenty-sixth line, to read out the voltages $2E_2$, $3E_2$, $4E_2$ and $5E_2$ stored at the next four addresses. The DAC 84 would thereupon generate the five-step staircase of segment $10_2$ in FIG. 1. The waveform generator would continue to generate the five $E_2$ voltage steps until the end of the last horizontal line of segment $10_2$, i.e., the end of line 50, following which the counter 80 would be incremented to the addresses corresponding to the voltage steps $E_3$, $2E_3$, $3E_3$, $4E_3$ and $5E_3$ of staircase segment $10_3$, and so on until all 262.5 lines of the field have been scanned. The full field DAC output signal is a staircase signal having the programmed number of segments $10_1$, $10_2$, etc., with the programmed number of steps, e.g., five, of voltages $E_1$, $E_2$, etc. This staircase signal is applied as the second input to the add circuit 72, the output of which is the composite staircase test waveform illustrated in FIG. 1. Upon completion of a full 262.5 line field, a field pulse is transmitted from the sync generator 70 to the counter 80 to reset it to zero, and the generator is ready to repeat the sequence for the next field.

With reference now to FIGS. 4A–4D, it will be appreciated that the video staircase test waveforms there depicted may be generated by the waveform generator of FIG. 7 by proper selection of the value of N relative to M and by appropriate programming of the PROM 82. Turning first to the waveform 40 of FIG. 4C, in which there are ten different voltage levels $E_1$ to $E_{10}$ per horizontal line and the respective voltage levels are held constant for the entire field, N would be selected to produce ten pulses from divide circuit 76 for each output pulse from divide circuit 66. The PROM 82 would then produce ten voltage data outputs, in response to the ten address inputs per line from the counter 80, which correspond to the ten voltage levels $E_1$ to $E_{10}$ of FIG. 4C, and repetitively to generate such ten voltage data outputs for every horizontal line. This is basically the same program as with the waveform of FIG. 1, except that there are ten voltage levels, $E_1$ to $E_{10}$, per horizontal line instead of five and that the same ten voltage levels, $E_1$ to $E_{10}$, are generated over the entire field instead of for only 25-line segments.

Likewise, the waveform of FIG. 4D may be generated similarly to that of FIG. 1. In this instance, the value of N would again be selected to produce ten output pulses per horizontal line, i.e., so that N/M = 10, but the PROM 82 would have stored in the first half of the addressed locations voltages corresponding to levels $E_1$ to $E_{10}$ and in the second half of the addressed locations voltages corresponding to levels $E_{11}$ to $E_{20}$.

In the case of the waveform of FIG. 4A, the ratio of N to M would again be set at ten (N/M = 10), to produce the ten voltage levels per line there illustrated, i.e., five above the bias level and five below the bias level. There would thus be ten storage locations per line in the PROM 82. The ten storage locations for the voltage levels of the first twenty-five lines would have stored therein, in alternate locations, $BV + \frac{1}{2} E_1$ and $BV - \frac{1}{2} E_1$, where BV is the bias voltage. In response to the ten pulses per line from the divide circuit 76, therefore, the DAC 84 would generate the two-level waveform of segment $20_1$ of FIG. 4A. As will be appreciated, the PROM addresses corresponding to the voltage levels of segments $20_2$ to $20_{10}$ will likewise have stored therein voltages corresponding to $BV \pm \frac{1}{2} E_2$ to $BV \pm \frac{1}{2} E_{10}$, as the case may be.

Referring now to FIG. 4B, it will be apparent that there would be eleven output pulses from divide circuit 76 for each output pulse from divide circuit 66, i.e., N/M = 11, one pulse for each of the eleven voltage levels per line in the staircase waveform. The PROM storage location corresponding to the first voltage level in each of the first twenty-five lines, segment $30_1$, would thus contain $BV_1 + \frac{1}{2} E_1$, the second storage location would contain $BV_1 - \frac{1}{2} E_1$, the third location would contain $BV_2 + \frac{1}{2} E_{20}$, the fourth location would contain $BV_2 - \frac{1}{2} E_{20}$, and so on through the eleven storage locations associated with that line. Similarly the storage locations associated with the eleven levels per line of segment $30_2$ would contain, in order, $BV_1 + \frac{1}{2} E_2$, $BV_1 - \frac{1}{2} E_2$, $BV_2 + \frac{1}{2} E_{19}$, $BV_2 - \frac{1}{2} E_{19}$, etc. up to $BV_2 + \frac{1}{2} E_{19}$ in the tenth storage location and $BV_2 - \frac{1}{2} E_{19}$ in the eleventh storage location. This pattern would be repeated for each of the remaining lines of the field, with appropriate voltage data stored in the PROM storage locations corresponding to the various voltage levels of the line. For example, the first storage location of each line in segment $30_{10}$ would contain $BV_1 + \frac{1}{2} E_{10}$, the second would contain $BV_1 - \frac{1}{2} E_{10}$, the third $BV_2 + \frac{1}{2} E_{11}$, the fourth $BV_2 - \frac{1}{2} E_{11}$, and so forth.

Although the invention has been described herein with reference to specific embodiments thereof, it will be understood that such embodiments are susceptible of modification and variation without departing from the inventive concepts embodied therein. Accordingly, any such modifications and variations are intended to be included within the spirit and scope of the appended claims.

I claim:

1. A method for measuring the signal-to-noise ratio of a video signal transmission path, comprising:
   providing a full field video staircase test waveform in which the voltage spacing between the steps of said test waveform is changed at intervals across the full video field, with each of said voltage spacings corresponding to a particular signal-to-noise ratio in accordance with the principle of tangential noise measurement;
   transmitting the video test waveform over a transmission path;
   receiving the video test waveform from said transmission path and applying it to a video waveform monitor to display thereon a full horizontal field of the test waveform, wherein the steps of said test waveform appear on the monitor as vertically spaced-apart horizontal lines, the spacings between vertically adjacent ones of which correspond to the signal-to-noise ratios of the test waveform, whereby the signal-to-noise ratio of the video signal transmission path is directly readable from the waveform monitor display as the lowest signal-to-noise ratio provided in said test waveform for which the corresponding horizontal lines of the monitor display are filled in with noise to substantially uniform brightness.

2. The method of claim 1 wherein said waveform monitor comprises a general purpose oscilloscope.

3. The method of claim 2 wherein said receiving step further comprises the step of passing the video test waveform through a band limiting filter, to eliminate noise outside of the video bandwidth to be measured, and a noise weighting filter, to provide a weighted signal-to-noise ratio measurement.

4. The method of claim 1 wherein the voltage spacing between the steps of the video test waveform is progressively changed at said intervals across the full video field so as to provide horizontal lines on said waveform monitor which correspond to a progression of signal-to-noise values.

5. The method of claim 4 wherein the voltage spacing between the steps of the video test waveform is progressively changed at said intervals by amounts which correspond to 1 dB differences in the signal-to-ratio, whereby a progression of signal-to-noise values at 1 dB increments is provided on said waveform monitor.

6. The method of claim 4 wherein the horizontal sweep of said waveform monitor is adjusted to display said horizontal lines such that each signal-to-noise ratio value corresponds to a separate horizontal division of the monitor screen.

7. The method of claim 1 wherein:
the intervals at which the voltage spacing between the steps of the staircase test waveform is changed correspond to a predetermined number of horizontal scan lines in the video field; and
the staircase test waveform has at least two voltage steps per horizontal scan line within each interval of the video field and the voltage spacing therebetween corresponds to a particular signal-to-noise ratio value, whereby the full field display of the staircase test waveform on the waveform monitor appears as sets of horizontal lines, the number of sets corresponding to the number of intervals in the staircase test waveform and the number of lines per set corresponding to the number of steps provided per horizontal scan line.

8. The method of claim 7 wherein the staircase test waveform has three or more steps per horizontal scan line within each interval of the video field and the voltage spacing between the steps of a given interval is constant, whereby each set of horizontal lines in the full field display contains three or more vertically-spaced horizontal lines whose spacing corresponds to the same digital-to-noise ratio.

9. The method of claim 7 wherein the staircase test waveform has three or more steps per horizontal line within each interval of the video field and the voltage spacing between adjacent steps of each interval is progressively increased from step to step by an amount to correspond to a different signal-to-noise ratio, whereby each set of horizontal lines in the full field display contains three or more vertically-spaced horizontal lines whose spacings correspond to progressively increasing signal-to-noise ratios.

10. The method of claim 1 wherein the intervals at which the voltage spacing between the steps of the staircase test waveform is changed correspond to timed intervals within individual horizontal scan lines of the video field.

11. The method of claim 10 wherein the voltage spacing between steps is progressively increased at each interval by an amount corresponding to a 1 dB increase in the signal-to-noise ratio, whereby a progression of signal-to-noise ratios at 1 dB intervals is provided on said waveform monitor.

12. The method of claim 1 wherein:
the intervals at which the voltage spacing between the steps of the staircase test waveform is changed correspond to a predetermined number of horizontal scan lines in the video field and to timed intervals within the individual horizontal scan lines;
the staircase test waveform has three voltage steps per each horizontal line within each interval of the video field, the voltage spacing between two of the steps corresponding to high signal-to-noise ratio and the voltage spacing between the other two steps corresponding to a low signal-to-noise ratio; and
the voltage spacing between the high-ratio steps being progressively increased, the voltage spacing between the low-ratio steps being progressively decreased, at said intervals of horizontal scan lines, whereby the full field display of the staircase test waveform on the waveform monitor appears as sets of three horizontal lines each, the number of sets corresponding to the number of intervals of horizontal scan lines at which the voltage spacings were changed and the spacings between the horizontal lines of adjacent sets corresponding to progressively increasing and progressively decreasing signal-to-noise ratios.

13. A system for measuring the signal-to-noise ratio of a video signal transmission path, comprising:
a source at the transmit end of a video signal transmission path of a full field video staircase test waveform in which the voltage spacing between the steps of said test waveform is changed at intervals across the full video field, with each of said voltage spacings corresponding to a particular signal-to-noise ratio in accordance with the principle of tangential noise measurement;
means for transmitting said video test waveform over the transmission path;
means at the receiving end of the transmission path for receiving said video test waveform;
a waveform monitor coupled to said receiving means for application thereto of the video test waveform so as to display on said monitor a full horizontal field of the test waveform wherein the steps of said test waveform appear as vertically spaced-apart horizontal lines, the spacings between vertically adjacent ones of said lines corresponding to the signal-to-noise ratios of the test waveform, whereby the signal-to-noise ratio of the video signal transmission path is directly readable from the waveform monitor display as the lowest signal-to-noise ratio provided in said test waveform for which the corresponding horizontal lines of the monitor display are filled in with noise to substantially uniform brightness.

14. The system of claim 13 wherein said waveform monitor comprises a general purpose oscilloscope.

15. The system of claim 13 wherein said receiving means includes:
- band limiting filter means for eliminating noise outside of the video bandwidth to be measured; and
- noise weighting filter means for shaping the noise within the bandwidth to be measured so as to provide weighted signal-to-noise ratio measurement.

16. The system of claim 13 wherein said waveform source comprises a waveform generator for generating said video staircase test waveform.

17. The system of claim 16 wherein said waveform generator comprises:
- a source of clock pulses;
- means responsive to said clock pulses for generating at a predetermined rate a video horizontal line signal, including a horizontal blanking signal and a horizontal sync pulse;
- means responsive to said clock pulses during the non-blanking portion of said horizontal line signal for generating a staircase signal having a predetermined number of voltage steps, the voltage spacing between adjacent steps of said staircase signal corresponding to a particular signal-to-noise ratio as aforesaid; and
- means for combining said horizontal line signal and said staircase signal to provide the video staircase test waveform.

18. A waveform generator for generating a video staircase test waveform, comprising:
- a source of clock pulses;
- means responsive to said clock pulses for generating at a predetermined rate a video horizontal line signal, including a horizontal blanking signal and a horizontal sync pulse;
- means responsive to said clock pulses during the non-blanking portion of said horizontal line signal for generating a staircase signal having a predetermined number of voltage steps per horizontal line, the voltage spacing between adjacent steps of said staircase signal corresponding to a signal-to-noise ratio in accordance with the principle of tangential noise measurement; and
- means for combining said horizontal line signal and said staircase signal to provide a video staircase test waveform.

19. The waveform generator of claim 18 wherein said staircase signal generating means comprises:
- addressable memory means for storing voltage information corresponding to the voltage level of each step of the staircase signal;
- counter means responsive to said clock pulses during the non-blanking portion of each horizontal line for addressing the memory locations in said memory means which correspond to the voltage steps in said each horizontal line; and
- means for applying the voltage information in said addressed memory locations as an analog signal to said combining means for combination with the corresponding horizontal line signal to provide said video staircase test waveform.

20. The waveform generator of claim 19 wherein:
- said memory means comprises a programmable digital memory; and
- said means for applying the voltage information to the combining means comprises digital-to-analog converter means for generating said analog signal in response to the digital voltage data stored in said addressed memory locations.

21. The waveform generator of claim 19 wherein:
- said addressable memory means includes a memory location for each step of the staircase waveform over a full video field, said each memory location having stored therein voltage information representative of the voltage level of the corresponding step; and
- said counter means is responsive to said clock pulses to sequentially address said memory locations over the full video field, thereby to generate a full field video staircase test waveform.

22. The waveform generator of claim 22 wherein said staircase signal generating means further comprises means for resetting said counter means at the end of a full video field.

23. The waveform generator of claim 18 wherein said staircase signal generating means further comprises:
- counter means responsive to said clock pulses for determining the number of steps in the staircase waveform per horizontal line signal; and
- means for resetting said counter means at the end of each horizontal line signal.

24. The waveform generator of claim 23 wherein said horizontal line signal generating means further comprises counter means responsive to said clock pulses for determining the rate at which said horizontal line signals are generated.

* * * * *

UNITED STATES PATENT OFFICE
CERTIFICATE OF CORRECTION

Patent No. 4,172,263　　　　　　　　　　Dated　October 23, 1979

Inventor(s)　Robert C. Tenten

It is certified that error appears in the above-identified patent and that said Letters Patent are hereby corrected as shown below:

Col. 3, line 62, "on a" should read --on an--;
Col. 6, line 67, "contant" should read --constant--;
Col. 11, line 60, "digital-to-noise" should read --signal-to-noise--.

Signed and Sealed this

Twenty-ninth Day of April 1980

[SEAL]

Attest:

SIDNEY A. DIAMOND

Attesting Officer　　　Commissioner of Patents and Trademarks